Figure 1:
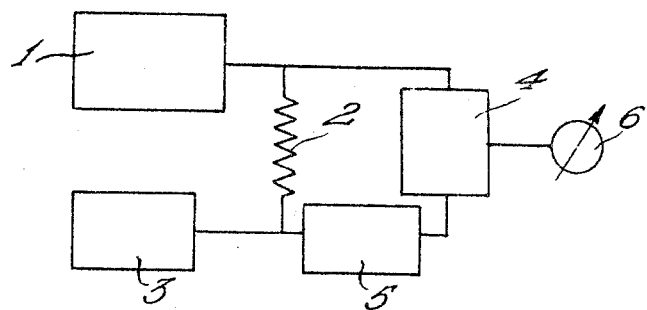

Sept. 20, 1966 A. DENIS ETAL 3,274,485
APPARATUS FOR MEASURING MAGNETIC FIELD GRADIENTS BY
NUCLEAR RESONANCE, AND APPLICATIONS THEREOF
Filed July 18, 1962

United States Patent Office 3,274,485
Patented Sept. 20, 1966

3,274,485
APPARATUS FOR MEASURING MAGNETIC FIELD GRADIENTS BY NUCLEAR RESONANCE, AND APPLICATIONS THEREOF
André Denis, Herblay, and Guy Ripart, Plessis-Robinson, France, assignors to Sud-Aviation Société Nationale de Constructions, Paris, France
Filed July 18, 1962, Ser. No. 210,729
Claims priority, application France, July 20, 1961, 868,434, Patent 1,305,456
3 Claims. (Cl. 324—.5)

A variety of apparatus using nuclear resonance have been resorted to for measuring the characteristics of a magnetic field and, more particularly, its magnitude. Mostly, for this purpose, a proton resonance probe is used which consists, in the well known manner, of a sample containing nuclear spins and disposed within the coil of an oscillating circuit.

It is also useful to compare the magnitude at two different points of a magnetic field applied to two proton resonance probes respectively positioned at said points, with a view to determine the gradient of the field between those points. Such comparisons have been made by measuring separately the field magnitudes at these points, or by using a comparator device connected to independent proton resonance probes.

With a view to permitting such comparisons, this invention has for its object to provide an apparatus for measuring magnetic field gradients by nuclear resonance, said apparatus comprising a reference nuclear resonance probe inserted into a circuitry which is adapted to display the proton frequency of said probe and to feed, through a loose coupling arrangement, a second nuclear resonance probe, the output signals from said two probes being injected into a phase discriminator of which the output current, which is a direct function of the magnetic field gradient between the points of location of said probes, is directly read and/or recorded.

The reference probe is preferably positioned in the coil of the oscillating circuit of a proton frequency oscillator.

In a preferred embodiment, the proton frequency oscillator consists of a self-oscillator of adjustable frequency which is servo-controlled by the nuclear resonance frequency of the nuclei of the substance utilized in said first reference probe, as disclosed in the U.S. patent application Serial No. 209,540 filed by us on July 13, 1962, now Patent No. 3,222,593, assigned to Sud-Aviation Société Nationale de Constructions Aeronautiques and entitled "Improvements to Methods and Apparatus for Measuring the Characteristics of a Magnetic Field at Any Given Point by Nuclear Resonance."

The invention also relates to industrial applications of the apparatus hereinbefore disclosed, and more particularly to apparatus for measuring magnetic field gradients and to apparatus for detecting ships, aircraft, missiles or projectiles.

The description which follows with reference to the accompanying drawings, which are filed by way of example only and not of limitation, will give a clear understanding of how the invention may be carried into practice and will disclose other features thereof.

Figure 2:
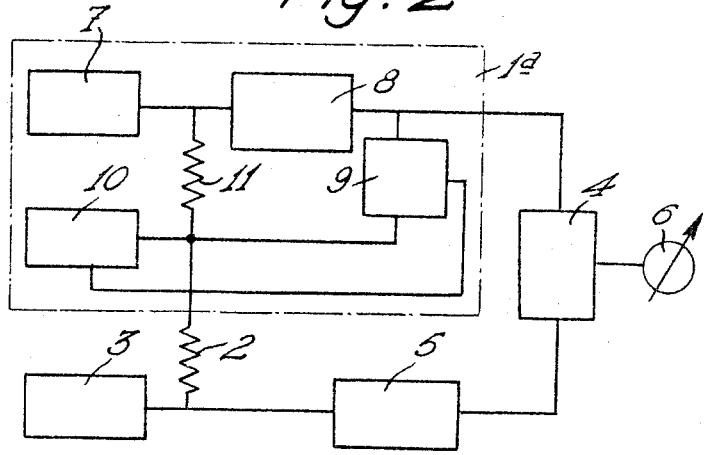

In the drawings filed herewith:

FIG. 1 is a schematic and block diagram of an apparatus for measuring field magnet gradients according to a first embodiment of this invention, and FIG. 2 is a schematic and block diagram of an apparatus for measuring magnetic field gradients according to a second embodiment of the invention.

Referring first to FIG. 1, there is shown a proton-frequency oscillator 1 which utilizes the reference probe and is loosely coupled through an impedance 2 to a second probe 3 consisting of a circuit which is tuned with a fairly wide pass-band to the proton oscillation frequency of the substance utilized in said probe. A phase discriminator 4 has its inputs respectively connected to the oscillator 1 and, through a low-noise-level amplifier 5, to the second probe 3. The output current from the discriminator 4 feeds an apparatus 6 sensitive to current values and consisting of an indicator or a recorder.

If the probe 3, the proton frequency of which is F, is excited through the impedance 2 by the oscillator 1 the proton frequency of which is $F_0$, there will be obtained at the output of the amplifier 5 a voltage of frequency $F_0$ which, with reference to the output voltage from the oscillator 1, within a limited range, will have a phase shift $\varphi$ such that:

$$\varphi = A(F-F_0)$$

where A is a constant, provided that care is taken to compensate the phase at the origin, i.e. if it is arranged that $\varphi=0$ for $F=F_0$ when the two probes are subjected to the action of equal magnetic fields.

As is well known, if these two voltages are injected into the phase discriminator 4, the output therefrom will be a current $i$ which is a function of the phase shift $\varphi$ between the two voltages. This function may be assumed to be linear, at least within a limited range. One may therefore write:

$$i = B\varphi$$

where B is a constant, or:

$$i = AB(F-F_0)$$
$$= K(H-H_0)$$

where H and $H_0$ are respectively the field magnitudes at the points of location of the two probes, and K is a constant. Thus, a measure of the field gradient between said two points is in fact obtained.

A specific embodiment, which is particularly advantageous by reason of its symmetry, consists in utilizing as the proton frequency oscillator associated to the reference probe, the apparatus which is described in the aforementioned U.S. patent application and illustrated in FIG. 2. In this figure, the reference proton-frequency oscillator 1a comprises its reference probe 7 feeding through a low-noise-level amplifier 8 a phase discriminator 9, which discriminator is also fed by a self-oscillator 10 which in turn is slaved to the current furnished by said phase discriminator and is loosely coupled to the probe 7 through an impedance 11. Said phase discriminator 9 allows for the nuclear resonance frequency of the probe 7 to be automatically followed up by the local oscillator 10. As in the circuitry utilized in FIG. 1, the second probe 3 is weakly connected to the local self-oscillator 10 through an impedance 2 and, through the medium of the low-noise-level amplifier 5, to one of the inputs of the phase discriminator 4, the other input of which is connected to the amplifier 8. The output current from said discriminator supplies the device 6 sensitive to current values.

Such an arrangement makes it still easier to achieve the condition $\varphi=0$ for $F=F_0$, since when the probes 7 and 3 are identically fed by the oscillator 10 through the respective impedances 11 and 12, it will be appreciated that, if the respective associated components 7 and 3, 2 and 11, 5 and 8 are identically adjusted, the condition $\varphi=0$ for $F=F_0$ will be achieved ipso facto, and the indicator 6 will in fact indicate a current which is proportional to the difference between the magnetic fields acting upon the probes 7 and 3, i.e. to the gradient of the magnetic field between the points of location of said probes.

It should be noted that this system, which is highly sensitive to the smallest differences in field magnitude, cannot function properly unless the frequency differences $(F-F_0)$ remain sufficiently within the width of the proton resonance line of the probe 3.

The system described in the accompanying figures can be utilized in apparatus for measuring magnetic field gradients, and more particularly in apparatus of this type used for detecting ships, aircraft, missiles or projectiles.

The circuits and components employed above are per se known. Specifically, the block diagram 1 may be a proton-frequency oscillator of the kind disclosed by British Patent 867,844 published on May 10, 1961, the block diagram 3 may be any conventional proton probe, the block diagram 5 may be a completely conventional low-noise-amplifier, and the block diagram 1a may be a proton-frequency oscillator of the kind described in U.S. patent application Ser. No. 209,540 filed on July 13, 1962, by applicants and assigned to the same assignee.

What we claim is:

1. Apparatus for measuring by nuclear resonance the gradient of a magnetic field between two predetermined points comprising, in combination, a proton-frequency oscillator located at one of the predetermined points and only subjected to the action of the magnetic field the gradient of which is to be measured, weak coupling means connected to said proton-frequency oscillator at the output thereof, a proton resonance probe located at the other of the predetermined points and fed by said proton-frequency oscillator through said weak coupling means, means connected to said proton-frequency oscillator and said proton probe at the outputs thereof for generating a current which is a function of the phase shift between the output signals of said oscillator and of said probe and thereby a function of the magnetic field gradient between said predetermined points, and a device sensitive to a current value and connected to said current generating means.

2. Apparatus for measuring by nuclear resonance the gradient of a magnetic field between two predetermined points comprising, in combination, a proton-frequency oscillator located at one of the predetermined points and only subjected to the action of the magnetic field the gradient of which is to be measured, weak coupling means connected to said proton-frequency oscillator at the output thereof, a proton resonance probe located at the other of the predetermined points and fed by said proton-frequency oscillator through said weak coupling means, means connected to said proton-frequency oscillator and said proton probe at the outputs thereof for generating a current which is a function of the phase shift between the output signals of said oscillator and of said probe and thereby a function of the magnetic field gradient between said predetermined points, the phases of the output signals of said proton-frequency oscillator and of said proton resonance probe being so adjusted that the current delivered by said current generating means is zero when said oscillator and said probe are subjected to the action of equal magnetic fields, and a device sensitive to a current value and connected to said current generating means.

3. Apparatus for measuring by nuclear resonance the gradient of a magnetic field between two predetermined points comprising, in combination, a proton-frequency oscillator located at one of the predetermined points and only subjected to the action of the magnetic field the gradient of which is to be measured, an impedance connected to said proton-frequency oscillator at the output thereof, a proton resonance probe located at the other of the predetermined points and fed by said proton-frequency oscillator through said impedance, means connected to said proton-frequency oscillator and said proton probe at the outputs thereof for generating a current which is a function of the phase shift between the output signals of said oscillator and of said probe and thereby a function of the magnetic field gradient between said predetermined points, the phases of the output signals of said proton-frequency oscillator and of said proton resonance probe being so adjusted that the current delivered by said current generating means is zero when said oscillator and said probe are subjected to the action of equal magnetic fields, and a device sensitive to a current value and connected to said current generating means.

References Cited by the Examiner

UNITED STATES PATENTS

| | | | |
|---|---|---|---|
| 2,916,690 | 12/1959 | Leete | 324—0.5 |
| 2,975,360 | 3/1961 | Bell | 324—43 |
| 3,103,621 | 9/1963 | Fraser | 324—0.5 |
| 3,103,623 | 9/1963 | Greenwood | 324—0.5 |
| 3,127,556 | 3/1964 | Gielow et al. | 324—0.5 |

FOREIGN PATENTS 1,212,406   10/1959   France.

WALTER L. CARLSON, Primary Examiner.

MAYNARD R. WILBUR, CHESTER L. JUSTUS,
Examiners.

A. E. RICHMOND, Assistant Examiner.